(12) United States Patent
Adler et al.

(10) Patent No.: US 9,777,872 B2
(45) Date of Patent: *Oct. 3, 2017

(54) FLUID SPILL CONTAINMENT, LOCATION, AND REAL TIME NOTIFICATION DEVICE WITH CABLE BASED SENSOR

(71) Applicants: Jeffrey Scott Adler, Beaconsfield (CA); Harold Russell Baird, Marietta, GA (US)

(72) Inventors: Jeffrey Scott Adler, Beaconsfield (CA); Harold Russell Baird, Marietta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/987,153

(22) Filed: Jul. 5, 2013

(65) Prior Publication Data

US 2015/0010356 A1 Jan. 8, 2015

(51) Int. Cl.
| | |
|---|---|
| *G01M 3/18* | (2006.01) |
| *F16L 9/18* | (2006.01) |
| *G01M 3/16* | (2006.01) |
| *G01M 3/28* | (2006.01) |

(52) U.S. Cl.
CPC ............ *F16L 9/18* (2013.01); *G01M 3/165* (2013.01); *G01M 3/18* (2013.01); *G01M 3/283* (2013.01); *F16L 2201/30* (2013.01)

(58) Field of Classification Search
CPC ........... F16L 9/18; F16L 2201/30; F17D 5/04; G01M 3/18
USPC ....... 405/52; 285/93, 123.1; 137/15.11, 312; 73/40.5 R; 340/605
See application file for complete search history.

(56) References Cited

U.S. PATENT DOCUMENTS

| | | | | |
|---|---|---|---|---|
| 3,564,526 A | * | 2/1971 | Butts | G01M 3/165 |
| | | | | 174/115 |
| 3,721,270 A | * | 3/1973 | Wittgenstein | 138/104 |
| 3,863,679 A | * | 2/1975 | Young | 138/106 |
| 3,903,929 A | * | 9/1975 | Mock | 138/115 |
| 3,943,965 A | | 3/1976 | Matelena | |
| 4,112,417 A | * | 9/1978 | Himeno | G01M 3/045 |
| | | | | 340/605 |

(Continued)

FOREIGN PATENT DOCUMENTS

| CA | 1200874 A1 | 2/1986 |
|---|---|---|
| CA | 2310557 A1 | 11/2001 |

(Continued)

OTHER PUBLICATIONS

Alaska Department of Environmental Conservation, Technical Review of Leak Detection Technologies, vol. 1, Crude Oil Transmission Pipelines, 1999.

(Continued)

*Primary Examiner* — Benjamin Fiorello (57) ABSTRACT

Described herein is an autonomous fluid spill containment device for a pipeline which has a carrier conduit for transporting a fluid and a containment conduit located around the carrier conduit to define an interstitial space for receiving fluid spilled from the carrier conduit. The device includes a spilled fluid barrier for stopping spilled fluid flow. The fluid barrier is located in the interstitial space and extending between the carrier conduit and the containment conduit. A cable sensor is associated with the containment conduit for detecting spilled fluid flowing in the containment conduit.

36 Claims, 7 Drawing Sheets

(56) References Cited

U.S. PATENT DOCUMENTS

| | | | |
|---|---|---|---|
| 4,450,711 A * | 5/1984 | Claude | 73/40.5 R |
| 4,673,926 A * | 6/1987 | Gorman | 340/605 |
| 4,723,441 A * | 2/1988 | Sweeney | 73/40.5 R |
| 4,786,088 A * | 11/1988 | Ziu | 285/123.1 |
| 5,018,260 A | 5/1991 | Ziu | |
| 5,190,069 A * | 3/1993 | Richards | G01M 3/18 137/312 |
| 5,343,191 A * | 8/1994 | McAtamney | 340/605 |
| 5,708,195 A * | 1/1998 | Kurisu et al. | 73/40.5 R |
| 6,032,699 A * | 3/2000 | Cochran et al. | 138/104 |
| 6,123,110 A * | 9/2000 | Smith et al. | 138/98 |
| 6,489,894 B2 * | 12/2002 | Berg | 340/605 |
| 6,634,387 B1 * | 10/2003 | Glejb.o slashed.l | 138/104 |
| 6,970,808 B2 * | 11/2005 | Abhulimen et al. | 702/185 |
| 7,441,441 B2 * | 10/2008 | Omer | 73/40.5 R |
| 7,500,489 B2 * | 3/2009 | Folkers | 137/312 |
| 8,131,121 B2 * | 3/2012 | Huffman | 385/12 |
| 8,177,424 B2 * | 5/2012 | Hampson et al. | 374/131 |
| 8,234,911 B2 * | 8/2012 | Jax | 73/49.5 |
| 8,256,469 B2 * | 9/2012 | Felix-Henry | 138/114 |
| 8,418,529 B2 * | 4/2013 | Coudray et al. | 73/40.5 R |
| 8,479,566 B2 * | 7/2013 | Haseloh et al. | 73/49.1 |
| 8,608,014 B2 * | 12/2013 | Mueller et al. | 220/586 |
| 8,661,907 B2 * | 3/2014 | Davis et al. | 73/655 |
| 8,766,806 B2 * | 7/2014 | McDowell | 340/605 |
| 2003/0037596 A1 * | 2/2003 | Sorensen | 73/40.7 |
| 2003/0160447 A1 * | 8/2003 | Stark et al. | 285/123.1 |
| 2004/0154380 A1 * | 8/2004 | Walker | 73/40.5 R |
| 2005/0212285 A1 * | 9/2005 | Haun | 285/123.1 |
| 2009/0142138 A1 * | 6/2009 | McCarthy et al. | 405/158 |
| 2010/0005860 A1 * | 1/2010 | Coudray et al. | 73/40.5 R |
| 2013/0170519 A1 * | 7/2013 | Alliot | 374/161 |

FOREIGN PATENT DOCUMENTS

| | | |
|---|---|---|
| CA | 2416171 A1 | 7/2004 |
| CA | 2582213 A1 | 9/2007 |
| CN | 1414283 A | 4/2003 |
| CN | 101749542 A | 6/2010 |
| DE | 102005018317 A1 | 10/2006 |
| WO | WO2004094894 A2 | 11/2004 |
| WO | WO2007087720 A1 | 8/2007 |
| WO | WO2011151643 A2 | 12/2011 |

OTHER PUBLICATIONS

Geiger, Gerhart, State-of-the-Art in Leak Detection and Localization, Germany, Pipeline Technology 2006 Conference.

* cited by examiner

FLUID SPILL CONTAINMENT, LOCATION, AND REAL TIME NOTIFICATION DEVICE WITH CABLE BASED SENSOR

TECHNICAL FIELD

The present relates to fluid transportation using pipelines, and more particularly to a fluid spill containment, accurate location, and real time notification device and system for use with pipelines.

BACKGROUND

Pipeline transportation of energy sources has never been so important to the energy infrastructure and consumption of developing nations. Our economies and base of manufacturing rely heavily on the safe and timely provision of energy that may be transported through pipelines in different forms. This quest for energy sources has made the necessity of pipelines an inherent component in our society as a result of their ability to economically transport large volumes of liquids and gases. From crude oil to liquid natural gas, to tar sand oil: the reliable delivery of these valuable commodities for processing or immediate use has never been so important to powering our homes, businesses, towns, cities and nations. The transportation of energy sources often occurs over vast distances through rough terrain, difficult environments, important agricultural lands, valuable ecosystems, extreme weather, hydrologically sensitive areas, and potentially unstable regions.

However, an inherent problem with energy source pipelines is the catastrophic impact a spill or leak can have on our environments, ecosystems, humans and wildlife. The risk to valuable water reserves including but not limited to: the wetlands, streams, rivers, and aquifers which in some circumstances is the main source of natural clean drinking water for large segments of population bases is immeasurable. Further, as a result of the range of damage that may be caused due to the potentially toxic transported materials, the damage can persist for years.

In 2007, there were 161,000 miles of onshore pipeline transporting hazardous materials (chiefly petroleum products) in the US. From 2007 to 2011, significant spillage incidents averaged 117 per year, and released an average of 80,000 barrels of hazardous product per year into the environment for a total spillage of approximately 400,000 barrels. Other countries and nations throughout the world have experienced similar spill occurrences per mile of pipeline. There is now a great need for a pipeline system that will not only reduce the severity and occurrences of such releases, but concurrently and autonomously actively monitors a pipeline to enable the owner/operator to be able to know in real time precisely where and when there is a concern, exactly what the issue is at any specific location throughout the entire pipeline, and the appropriate response needed to affect said concern. What is needed is an effective containment, autonomous, self monitoring, and active notification system.

Safe pipelines are the key to moving forward in our energy dependant world. The majority of existing petrochemical pipelines in use are fabricated as single wall pipes, may be buried or above ground, and may have an insulating jacket. Whilst a single wall pipe has lower construction and repair costs than a double walled type, single wall pipe failures can release transported toxic materials to the surroundings with devastating results. Significant releases can occur before detection, resulting in catastrophic damage to the environment, humans and wildlife, as well as loss of goodwill, costly clean up operations and litigation against the pipeline owner/operator.

A number of pipeline leak detection systems have been designed to address the aforesaid problems, some of which are described below:

U.S. Pat. No. 6,032,699 by Graeber et al uses a dual wall system with a pressurized gas or liquid in the containment pipe. Leaks are detected by pressure sensors at sealed pipe segments, and a local audio or visual alarm is set. The design intent is for gas station fuel distribution. This design is not suitable for long pipelines due to the limited type of sensors and inability to communicate over long distances.

U.S. Pat. No. 5,433,191 by McAtamney uses a dual wall system zoned off by annular rings and detects the presence of liquids, including hydrocarbons using capacitive sensors. Each sensor is connected to a common panel for local audio and visual alarm indications. The design intent is for a storage tank next to an industrial plant. This design is not suitable for long pipelines due to the limited type of sensors and inability to communicate over long distances.

U.S. Pat. No. 6,970,808 by Abhulimen et al uses general pipeline parameters such as flow and pressure at monitoring stations along the line as inputs to central analysis and simulation algorithms to deduce when a spill has occurred. Since direct measurement at a spill location is not used, the method is subject to false alarms such as an operator changing a valve position, and has insufficient accuracy to detect small but significant leaks. Also, the method has no provision for spill containment.

U.S. Pat. No. 7,500,489 by Folkers uses a dual wall pipeline with brine in the container pipe at a higher pressure than the carrier pipe. The brine chambers are connected via tubes to a gas-brine reservoir, and leaks are detected by a float in the reservoir. To minimize brine requirements, the interstitial space is small, but this makes the example subject to false alarms from carrier pipe expansion and contraction due to carrier transported gas or liquid pressure or temperature changes. The use of brine also restricts use to non-corrosive carrier pipe materials such as fiberglass. Using a non-corrosive liquid such as glycol risks releasing toxic material to the environment. The small interstitial space also offers little protection for the carrier pipe from excavation equipment accidental damage.

U.S. Pat. No. 7,441,441 by Omer uses a dual wall pipeline with hydraulic fluid in the container pipe at a higher pressure than the carrier pipe. A break in the carrier pipe causes a hydraulic fluid pressure drop which is sensed. The pipeline is segmented by valve stations which close off the pipeline flow when the pressure drop is sensed. This method cannot distinguish between carrier pipe and container pipe leaks, and has a great potential for leaking hydraulic fluid into the environment. The system has no provision for reporting a leak, and it's isolation capability is limited to the distance between valve stations.

U.S. Pat. No. 6,489,894 by Berg uses a vacuum between the inner and outer pipes and a vacuum switch manifolded among more than one container section to determine when a leak has occurred. The patent refers to previous art which did not use a manifold, and therefore were more costly. The design intent, despite the title, is for use in storage tanks, not long pipelines. Scaling Berg's approach (or any of his referenced art approaches) to typical pipelines is cumbersome at best, and Berg's approach provides poor leak isolation information.

U.S. Pat. No. 6,123,110 by Smith et al provides a method for rehabilitating a single wall pipe into a double wall pipe by inserting a new smaller diameter pipe with stud spacers inside the existing pipe. The spacers provide for installing a leak detection system, examples of which are referred to but not well described. A manhole adapter is described. Smith's approach disadvantageously uses an old pipe for containment which is likely to fail when pressurized by a leak from the new inner pipe, and it makes no claims for leak isolation and reporting capability.

US Patent 2005/0212285 by Haun describes a method for reducing stresses in joints between the inner and outer pipe, and makes no claims for leak detection, isolation and reporting.

U.S. Pat. No. 3,943,965 by Matelena is a triple wall pipe which passes a glycol coolant between the outer and middle pipe to prevent hot oil or petroleum gas from melting the surrounding permafrost. The space between the middle pipe and carrier pipe is a vacuum insulator. Hydrometer and pressure sensors in the vacuum detect leaks from the coolant and carrier pipes. A photoelectric sensor detects changes in the glycol coolant transparency as an additional leak detection method. An oil/glycol separator and pump return leaked oil back into the carrier pipe. Matalena's approach is cumbersome to implement due to the triple wall construction, the large volumes of glycol needed, and the leak prone plumbing needed to cool and distribute the glycol. There is no method defined for preventing the glycol from leaking into the permafrost. The oil/glycol separator is unlikely to be able to accommodate large flow rate oil leaks. And there is no method defined for collecting and reporting sensor data.

U.S. Pat. No. 3,721,270 by Wittgenstein uses a plastic jacket around the pipe which is connected to mechanical liquid sensors and collection vessels at low points in the pipeline. In essentially horizontal pipeline sections, water fills the interstitial space and pressure sensors detect the effects of leaks. The invention claims that the leaking fluid pressure is attenuated by permitting relatively unencumbered passage to the collection vessel, therefore an inexpensive jacket may be used. Considering that pipelines transport petroleum products at high pressure, a leak of even moderate rate would quickly fill up any practical sized collection vessel, causing the jacket to burst. Also, there is no teaching of leak location reporting.

U.S. Pat. No. 3,863,679 by Young uses a casing around the pipe to transfer leaking fluid to collection casings at intervals along the pipe. The collection casing includes a pump for transferring the leaking fluid back into the pipe. While the method would seem to work for small leaks, even moderate leaks would require a large pump at each collection casing, which would be a considerable expense, considering it would seldom be required. Reducing that expense by spacing the pumps far apart results in a long section of pipe which would have to be possibly dug up and cleaned before being returned to service. Leak location reporting is inaccurate, being limited to the distance between collection casings.

U.S. Pat. No. 8,131,121 by Huffman uses multiple acoustic fiber optic cables either spirally wrapped around the pipe or running linearly down the pipe longitudinal axis and arranged side by side around its circumference. Multiple cables are claimed necessary for detection capability. Disadvantageously, the spiral cables require calibration for accurate leak location by installing acoustic generators at measured distances on the pipes during construction and recording the results. And the spiral cables limit the length of pipe which can be sensed, resulting in more monitor stations being required. While as few as one linear cable is taught, multiple cables are taught for increased performance, which is a complex approach. There is no teaching of leak containment.

U.S. Pat. No. 8,177,424 by Wokingham et al uses a fiber optic cable connected to temperature sensor pads located at discrete distances along the pipeline. Leaks are detected by temperature variations at sensor pad locations. Leak location accuracy is limited to the distance between sensor pads, and since the sensor pad readings are affected by heat transfer with the surrounding sea water, small to moderate leaks are unlikely to be detected. There is no teaching of leak containment.

U.S. Pat. No. 6,378,987 by Alliot uses a fiber optic cable fastened external to the pipe insulation, except at initially un-insulated field joints at discrete distances along the pipeline where the cable is wrapped around the joint. Insulation is then applied to the field joint. Leaks are detected by temperature variations at field joint locations. Leak location accuracy is limited to the distance between field joints, and small leaks are unlikely to be detected, since they do not adequately affect pipeline temperature. There is no teaching of leak containment.

Thus, there is a need for an improved pipeline which addresses the above-noted problems.

BRIEF SUMMARY

We have designed a fluid spill containment device and system for pipelines carrying energy sources which significantly reduces the probability and magnitude of pipeline releases as a result of its complete integrity and safety management program through containment in a dual wall pipe, instrumentation to sense a release and its accurate location, as well as a real time reporting network to trigger specific repair responses. The device and system are primarily based on the use of cable sensors which in specific combination with the dual wall pipe, which houses an annular bulk-head and spill door option, advantageously serves as a far superior containment and sensory device that would permit a pipeline operator to engage hydrocarbon transport in a safer environment. Whilst the device and system may be more expensive to put in place than a single wall pipeline, its superior autonomous self monitoring/detection, containment and reporting system significantly cuts down on valuable product loss and spill damage to the environment and associated costs, reduces lifetime maintenance costs, facilitates construction approval, and improves goodwill in the community. Advantageously, the device and system is retrofittable into conventional pipe designs presently used in the pipeline industry whereby adaptations are made to these pipes to enable them to serve as the main carrier pipe for the energy source transported.

Accordingly in one aspect there is provided an autonomous fluid spill containment device for a pipeline having a carrier conduit for transporting a fluid and a containment conduit located around the carrier conduit to define an interstitial space for receiving fluid spilled from the carrier conduit, the device comprising:

a spilled fluid barrier for stopping spilled fluid flow, the fluid barrier being located in the interstitial space and extending between the carrier conduit and the containment conduit; and a cable sensor associated with the containment conduit for detecting spilled fluid flowing in the containment conduit.

In one example, the device further includes a network monitor that interfaces for communicating with an operator's data collection, analysis and reporting systems. The cable sensor is connected to the network monitor so as to alert the operator to the location of the spilled fluid in real time.

In one example, the cable sensor is located in the interstitial space at a lower portion of the containment conduit.

In one example, the cable sensor is mounted external and in close proximity to the containment conduit.

In another example, the cable sensor extends through a plurality of interstitial spaces.

In another example, the cable sensor is a combination selected from the group consisting of: an acoustic fiber optic cable, a thermal fiber optic cable, and a pipe strain fiber optic cable.

In one example, the network monitor is interconnected with the cable sensor by a signal generation and analysis device, and includes a network modem, a network interface and a display/control, the network monitor being autonomously operable using solar power, battery and charger or alternate power. The network monitor is in communication with operator land and wireless networks, and is capable of communicating with an auto emergency shutdown.

In one example, the device includes a spill return door assembly located upstream from the spilled fluid barrier, the spill return door assembly, when implemented, includes a spill return door resiliently connected to the carrier conduit and is urged against an interior portion of the carrier conduit adjacent a spill opening. The spill door assembly includes a door spring connected to the spill return door, the door spring being located in the containment conduit.

In one example, the device is for use in a pipeline that is located above ground, ice or water, or underground or in ice or in water.

In another example, the fluid includes gas, chemicals (synthetic, organic, inorganic and natural fluids including food liquids), liquefied natural gas, liquefied gas including propane and butane, crude oil, water, petroleum, light oil, or oil sands oil.

BRIEF DESCRIPTION OF THE DRAWINGS

In order that the discovery may be readily understood, embodiments are illustrated by way of example in the accompanying drawings.

Further details of the device and its advantages will be apparent from the detailed description included below.

DETAILED DESCRIPTION

As used herein, the term "fluid" is intended to mean gas, natural gas; liquid, including chemicals (synthetic, organic and inorganic including natural food liquids), crude oil, petroleum, oil sand oil, and water, liquefied gas, such as propane, butane, liquefied natural gas, and the like.

Figure 1:
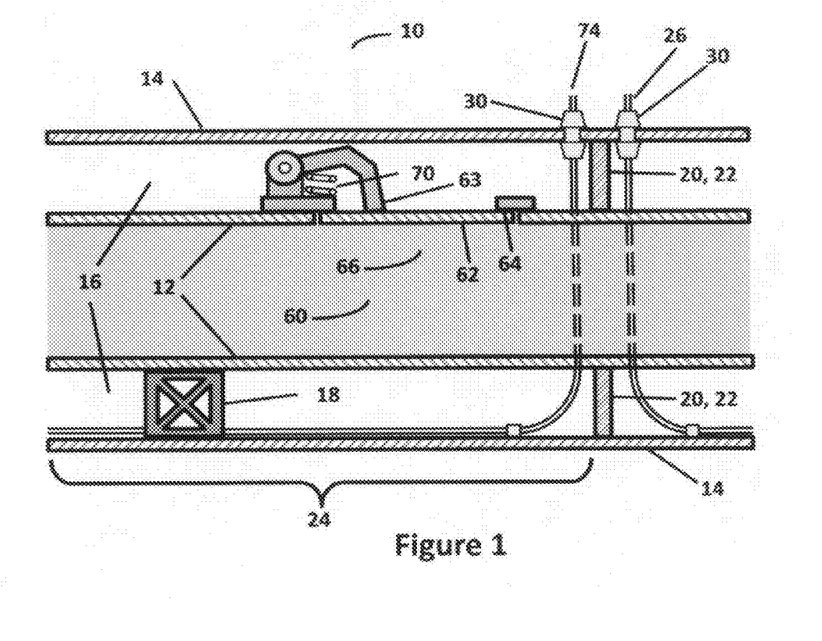
FIG. 1 is a longitudinal cross sectional view of a pipeline section showing a spill containment device and cable sensors leading to a network monitor in a no spill configuration.
Figure 2:
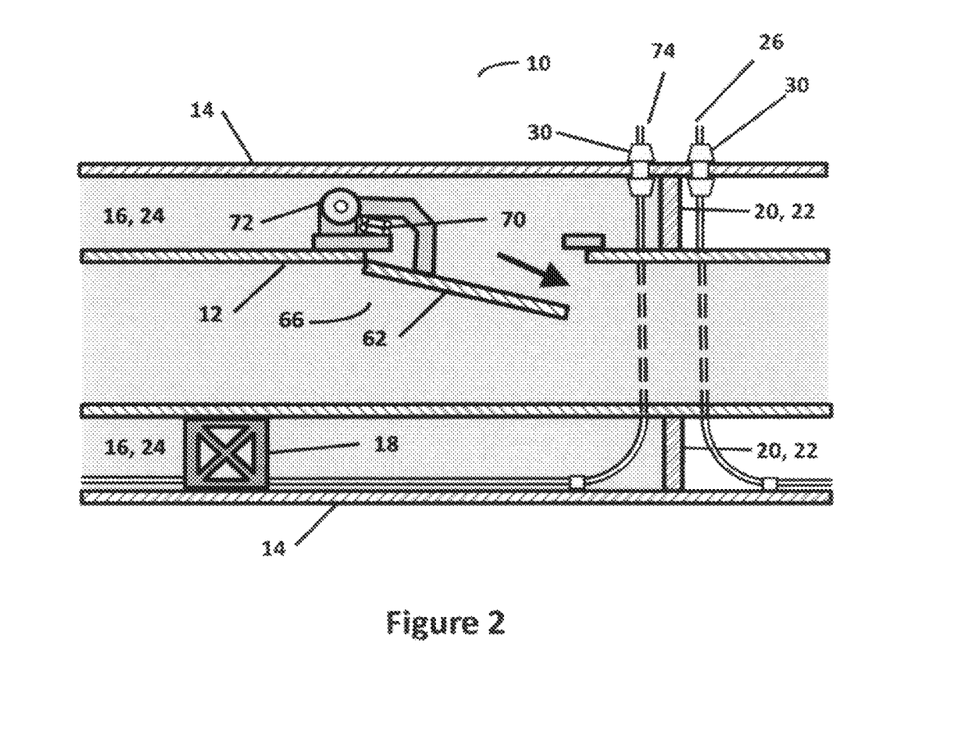
FIG. 2 is a longitudinal cross sectional view of the pipeline section showing the spill containment device and cable sensors leading to a network monitor in a spill configuration.

Referring to FIGS. 1 and 2, there is illustrated generally at 10 a fluid spill containment device. Broadly speaking, the device 10 comprises a double wall pipeline which includes an inner carrier conduit (pipe) 12 and an outer containment conduit (pipe) 14 which encases the carrier pipe 12, and which defines an interstitial space 16 around the carrier pipe 12. The carrier pipe 12 carries the fluid therealong. The interstitial space 16 receives fluid that spills from the carrier pipe 12 in the event that the carrier pipe 12 breaks or is structurally compromised. A plurality of spacers 18 are disposed substantially along the entire length of the pipeline and maintain separation between pipes 12, 14. A spilled fluid barrier 20 is located between the carrier pipe 12 and the containment pipe 14 and stops flow of fluid that spills into the interstitial space 16 from further flow downstream. The spilled fluid barrier 20 is an annular bulkhead 22 that is welded to the carrier pipe 12 and sealed to the containment pipe 14 to define separate release containment sections 24 along the pipeline. A spilled fluid sensor 26,74 is located in the interstitial space 16 to detect spilled fluid flowing in the containment pipe 14. Typically, the spilled fluid sensor 26,74 is located at a lower portion of the containment pipe 14. In the example shown, the spilled fluid sensor 26,74 runs along the bottom of the containment pipe from the downstream and upstream directions until exiting the containment pipe fluid barrier seals 30 to thereby be terminated at a network monitor station.

Still referring to FIGS. 1 and 2, a spill return door assembly 60 is located upstream from the spilled fluid barrier 20. The spill return door assembly 60 includes a spill return door 62 resiliently connected to the carrier pipe 12 and is urged against an interior portion 64 of the carrier pipe 12 adjacent a spill opening 66. The spill return door 62 is hingeably connected to a pivoting arm 63 at the upstream end and connected to the door spring 70. The spill door 62 is contoured to the carrier pipe 12 shape to limit obstruction to normal material flow and the passage of devices such as pigs. The spill door 62 is sealed (urged) against a restraint flange to prevent material flow from the carrier to the containment pipe. In the event of an upstream material release from the carrier pipe, the fluid will flow into the containment pipe 14, then back into the carrier pipe 12 through the spill door 62, and be detected by the cable sensors 26,74.

Figure 3:
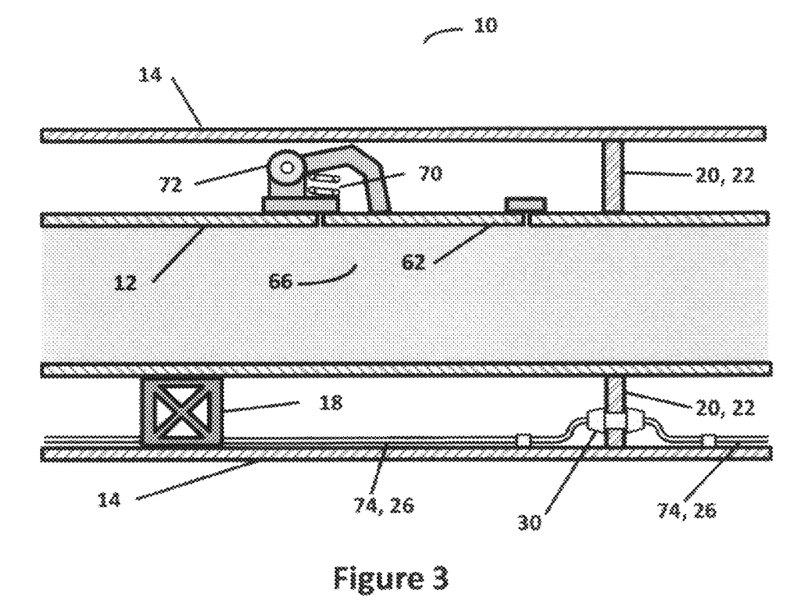
FIG. 3 is a longitudinal cross sectional view of a pipeline section showing the spill containment device and cable sensors passing through an annular bulkhead.

Referring now to FIG. 3, there is illustrated spilled fluid sensors 26,74 passing there along through spilled fluid barrier seals 30 so as to extend sensing spilled fluid throughout a plurality of interstitial spaces 16 depending on the length capability of the spilled fluid sensors 26,74.

Referring now to FIG. 3, there is illustrated spilled fluid sensors 26,74 passing there along through spilled fluid barrier seals 30 so as to extend sensing spilled fluid throughout a plurality of interstitial spaces 16 depending on the length capability of the spilled fluid sensors 26,74.

Still referring to FIGS. 1, 2 and 3, this fluid spill containment device embodiment is suitable for all installation locations, by way of example but not limited to, above ground, underground, underwater, in permafrost, and under overburdens such as runways, railroads and highways.

Figure 4:
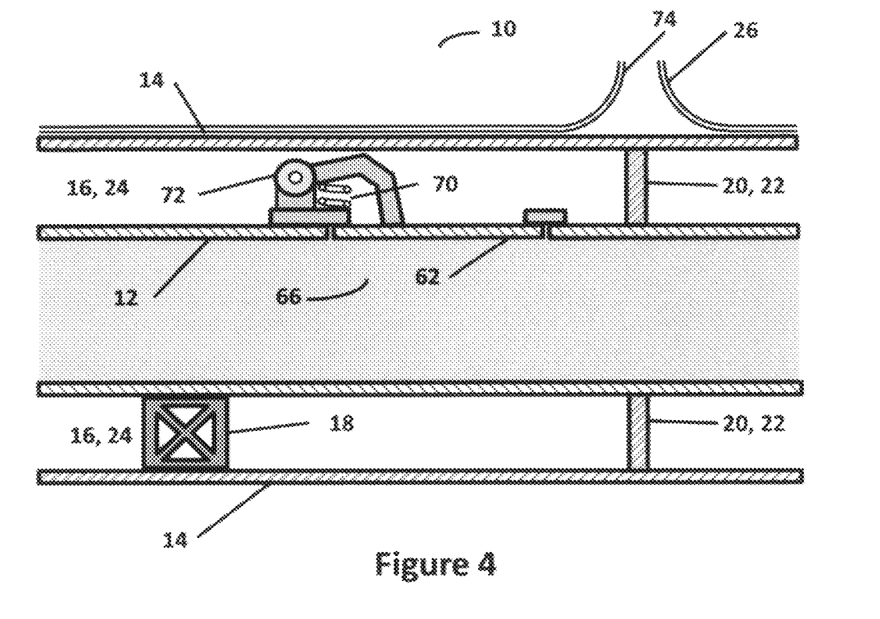
FIG. 4 is a longitudinal cross sectional view of a pipeline section showing the spill containment device and cable sensors external to the containment device leading to a network monitor (shown in FIG. 5)

Referring now to FIG. 4, there is illustrated an alternate embodiment whereby cable sensors 26,74 are located exterior of the containment pipe. In this embodiment, sensing of, by way of example, spill temperature, strain and acoustics can be achieved at a lower construction and maintenance cost. This fluid spill containment device embodiment is suitable for installation locations, by way of example but not limited to, above ground, underground and in permafrost.

Still referring to FIGS. 1, 2, 3 and 4, the device 10 is easily assembled to join a conventional single wall pipe. This may be done in circumstances where the operator of the pipeline needs the device 10 to join up with a previously existing line that is now traversing or in order to traverse some ecologically sensitive areas. The carrier pipe 12 size should be the same as the single wall pipe. The carrier pipe 12 is welded to the single wall pipe, and an annular transition cap is welded at the containment pipe 14 end to insure sanctity of the containment pipe 14 and complete airtight enclosure.

The autonomous fluid spill containment device 10 is typically used as part of an autonomous sensor and reporting network that monitors pipeline spillage, as described above. The network interface is in communication with the device and is configured to transmit data from the device 10 to an analysis and response center.

Figure 5:
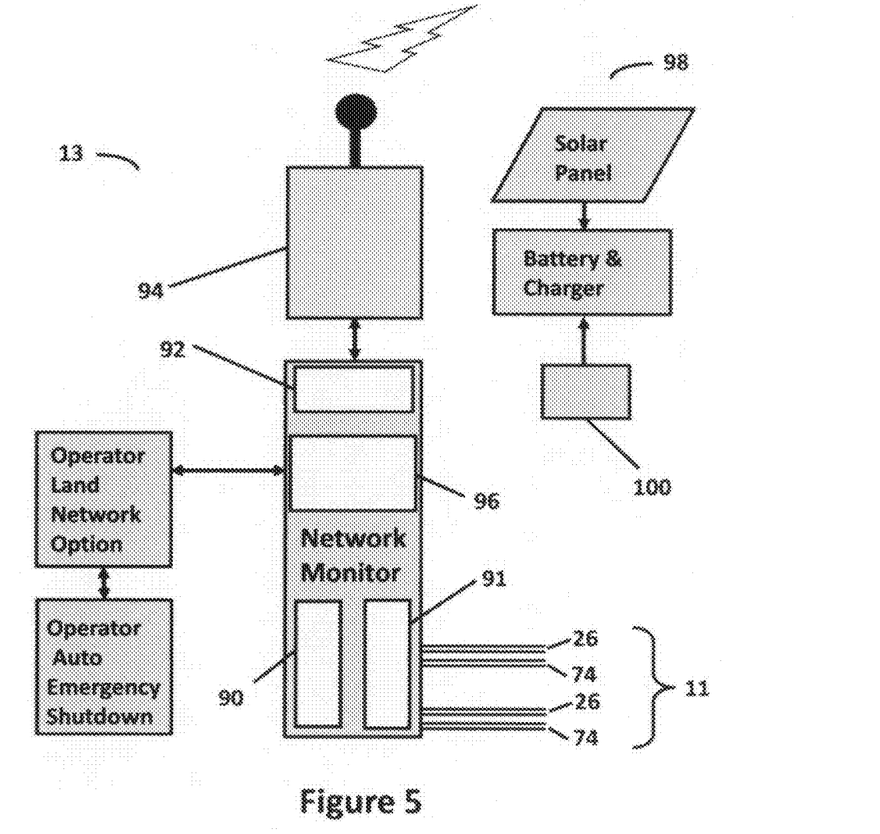
FIG. 5 is a diagrammatic representation of a network monitoring station.

Referring to FIG. 5, a network monitor station 13 forms the hub for the cable sensors 11. Typically two cable sensors 26,74, one upstream and one downstream connect to one network monitor station 13. Additional connections 26,74 allow one network monitor station 13 to connect to additional pipelines at or near the network monitor station 13 location. The network monitor station 13 includes a time domain reflectometer 91 or similar signal analysis device, display and control 90 for checkout and other servicing, and a modem 92 or other suitable means for communication with a remote satellite phone 94 and/or user wireless land network. A solar panel, battery and charger 98 provide autonomous remote location power. The user may elect to provide backup or alternate power 100 where available.

Still referring to FIG. 5, a network interface 96 option communicates with a user land network such as a SCADA (Supervisory Control And Data Acquisition) system or other system. In critical applications, the user may elect to use the network real time reporting capability to automatically shut down a pipeline segment until a release problem is resolved.

Figure 6:
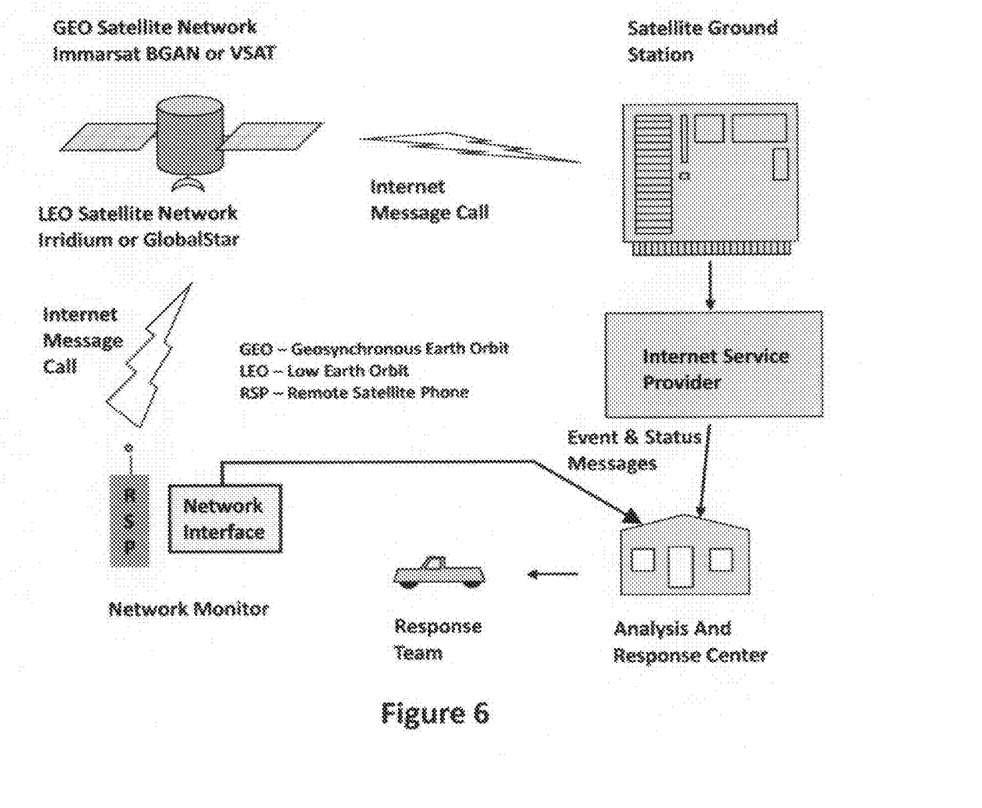
FIG. 6 is a diagrammatic representation of a sensor network reporting and response system.

Referring to FIG. 6, the sensor networks can use existing satellite and internet networks and user's land based networks to communicate sensor networks messages with the user's analysis and response center in real time. When a concern is identified in the analysis, the user response team is then dispatched to investigate and fix any problem.

Figure 7:
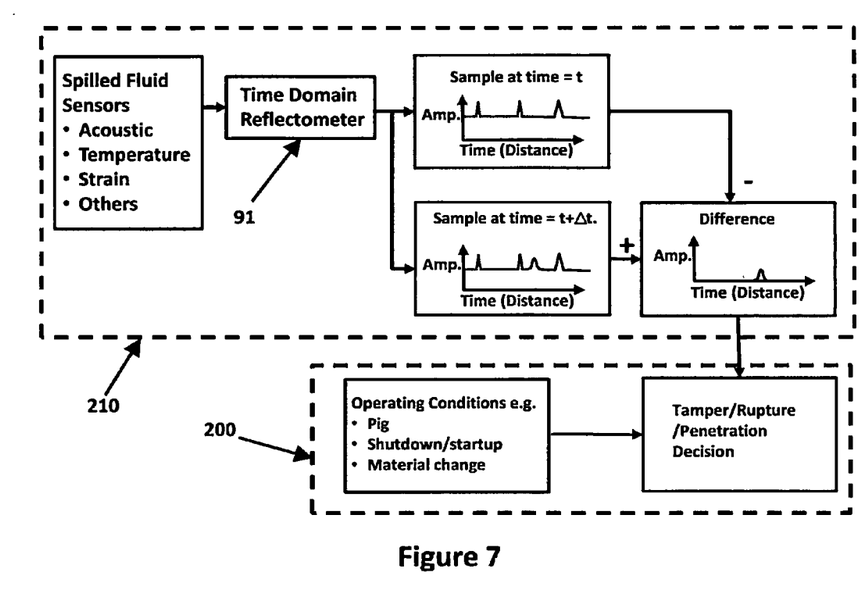
FIG. 7 is a process flow for detecting a loss of fluid using a time domain reflectometer technique.

Referring now to FIG. 7, example processing logic for detecting a spill is illustrated. When a leak occurs, it causes acoustic, temperature, pipe strain, hydrocarbon gasses, and the like, changes in the interstitial space which affect the spilled fluid sensor. If the spilled fluid sensor is a fiber optic cable, a time domain reflectometer at the monitor station 210 can be used, whereby a pulse of light sent down the cable is reflected back by discontinuities in the cable. The time delay between pulse transmission and reflection received can then be used to locate the discontinuity accurately. When the pipeline is operating, a reference amplitude versus distance profile is determined by averaging over some period of time. Typically, normal no spill reflections are caused by connectors or cable splices. If a sample difference from the reference exceeds a threshold, the difference data along with other sensor readings are sent to the Analysis and Response Center 200 where the data is compared with pipeline operating conditions to rule out normal causes such as the passage of a pig in the pipeline. Correlating signals from multiple sensor types as illustrated improves spill detection and location capability.

Operation

The autonomous fluid spill containment device 10 is typically used as part of an autonomous sensor and reporting network that monitors pipeline spillage, as described above, and communicates with an analysis and response center as shown in FIG. 6. The center is located to receive data over a network from the device 10 such that real time data received at the center is indicative of a fluid spill which then triggers a response at the center. A satellite network may also be used to communicate with the device to relay data from the device to the center.

The network monitor station(s) provide the device 10 with centralized control and interfacing to external systems. The network monitor station analyzes cable sensor signals, looking for critical spill and fault indications, including faulty cable sensors. If any critical fault indications are found, a message is sent immediately to the pipeline operator's analysis and response center. Otherwise, the accumulated messages are sent to the analysis and response center on a schedule predetermined by the pipeline operator. The messages may be sent via satellite or via a land network as determined by the pipeline operator.

Spill detection and containment is achieved using a dual coaxial pipe configuration in which an outer wall containment pipe surrounds a carrier pipe. Any fluid release is contained in the containment pipe. In the event there is a release from the carrier pipe, the transported material flows into the outer containment pipe. This flow of fluid into the containment pipe moves therealong until it reaches the end of the pipe component where it would reach the spill door which would facilitate transporting the material back into the carrier pipe. This brings the spill material in close proximity to the cable sensor, providing a quicker determination that a release is occurring. This shunting and redirecting of the material back into the carrier pipe at a further location down the line also promotes the safe and continued transport of the material until the crew can effect the necessary repairs. The combination of containment pipe and cable sensors has the unique ability to autonomously sense and notify the owner/operator in real time as to the nature and location of any small or large concern. In the event the spill door option is not implemented, or in the remote chance the spill door malfunctions, the system will continue to use the remaining sensors to detect and report the malfunction and presence of material in the containment pipe in real time.

The device 10 implements the use of a network monitor to autonomously report its findings and engage the response. This system is powered by solar energy and in conjunction with a battery and charger can be augmented with external power resources if available. The system can report via satellite link, allowing real time coverage in remote areas, and can connect directly to a user's monitoring and response system, to include automated shutdown of the affected pipeline to mitigate potential damage. This self monitoring, containment, and notification system is completely autonomous, easily repaired, and provides the owner/operator with a safe method to transport hazardous energy materials.

Release Reporting and Locating

To achieve these results, the system implements a sensor network that uses three types of messages to achieve functionality. Additional message types may also be used for network administration, but are typical practice and will not be described here.

1. Equipment Health Status. Sensor outputs are checked for shorted or broken connections and internal sensor electronics failures. The network monitor station also checks the health status of internal equipment. Equipment health status report messages including sensor station location are sent to the operator station in the analysis and response center.

2. Sensor Data. Sensor outputs are sampled periodically. Sensor data messages including release detections location are sent to the operator station in the analysis and response center.

3. Network Status. The network monitor accumulates reports of any failure to receive an expected message or message fragment and report this status to the operator station or on-site personnel when requested. Each network monitor has a unique identifier and known location.

The operator station processes the incoming messages by examining for release indications and by applying, e.g., trend and variance algorithms to the sensor data appropriate to the material being transported. Results are archived for future reference. The station displays results to the operator and triggers visual and aural alarms and related location for detected release events.

Transported Fluid Release Characteristics

To effectively detect transported material releases, the system is designed to monitor for the characteristics of the three types of releases—rupture, leak and seepage. Note that for a single wall pipe, release is an unintended loss of transported material to the pipeline surroundings. For a dual wall system, release includes loss from the inner carrier pipe to the outer containment pipe and ingestion from the surroundings into the containment pipe. Distinguishing characteristics of the three types of releases are:

Rupture—A high mass-rate release or ingestion caused by catastrophic pipeline failure. Typically occurs suddenly, and may be caused by external forces such as bulldozer, earth movement, sabotage, or other similar events, or the rapid progression of a pipeline structural failure.

Leak—A lower rate (but can still be substantial) release through a hole in the pipe smaller than the pipe diameter and does not progress significantly in size over a short time. A leak may occur suddenly from backhoe puncture, pilferage or other similar events or progress slowly from usage and environmental events such as corrosion, thermal stresses, or transported material abrasion.

Seepage—A very low rate release through a small hole or crack, typically caused by events such as corrosion, weld defects, or seal failure. The seepage may be intermittent, for example if a higher viscosity material plugs the opening after a previous lower viscosity material release, or an earth shift or ambient temperature change closes a crack.

Device Release Detection

Release detection is based on the use of cable sensors located throughout the length of the container pipe monitoring characteristics such as acoustics, temperature, and strain. Sensor readings indicating a spill condition are transmitted in real time to a user's reporting station for analysis and action.

Rupture Detection

A rupture causing a release from the carrier pipe is detected by a sudden change in sound and/or temperature and/or pipe strain, depending on the transported material. Depending on the nature of the rupture, the cable sensor may be damaged (albeit in rare circumstances) and stop reporting from that location, which in itself shall serve as a locator for the rupture.

Detecting a rupture causing ingestion is dependent on the extent of the failure. For ingestion in an unpressurized containment pipe, the likely detection will be a change in temperature from water ingestion, but this may take some time, or may not occur at all. If there is water ingestion, repair is required to avoid carrier pipe corrosion. If not, the repair is not time critical. In a pressurized containment pipe, there may be a slow pipe strain change if the pipe is buried, a fast change if not. If the cause is accidental human induced trauma such as excavation machinery, the operator may detect and report the event. If not, such as an act of terrorism or sabotage, the sound caused by this form of trauma will be detected by the acoustic cable sensor and reported.

Leak Detection

Leak detection for both release and ingestion is the same as rupture detection, except that sensor readings will change more slowly, and the cable sensor is unlikely to be damaged. Pilferage is likely to be detected by the acoustic cable sensor picking up vibrations from wall penetration tools and by the disturbed flow caused by the fluid loss. Without an acoustic sensor, pilferage may or may not be detected, depending on the pilferer's ability to penetrate the double walls without causing a detectable change in other sensor readings.

Seepage Detection

Seepage is inherently difficult to detect because sensor readings may be masked by signal noise, and by normal changes in transported material and pipeline environment. In the device 10, seepage is detected by the temperature cable sensor. For the critical case of transported material release, it is unlikely that there will be a concurrent seepage through the containment pipe to the environment. Ingestion is less critical, since the only significant effect is to accelerate corrosion of the carrier pipe. In both release and ingestion, detection allows adequate time for repair.

Cable Sensor Assessment

An inherent problem with current pipeline construction is that any release ends up in the environment. While the rate for some releases may be small, substantial time can elapse before the release is detected and stopped, which can result in substantial release volumes. The present invention is a major improvement through the use of direct measurement sensors, real time reporting and containment of large and small releases. This gives the pipeline operator time to build confidence in his release decision and to complete the repair.

Although the above description relates to a specific embodiment as presently contemplated by the inventor, it will be understood that the device in its broad aspect includes mechanical and functional equivalents of the elements described herein.

We claim:

1. An autonomous fluid spill containment device for a pipeline having a carrier conduit for transporting a fluid and a containment conduit located around the carrier conduit to define a closed interstitial space for receiving fluid spilled from the carrier conduit, the device comprising:
   a spilled fluid barrier having containment sections for stopping spilled fluid flow, the spilled fluid barrier being located in the interstitial space and extending between the carrier conduit and the containment conduit, the spilled fluid barrier being sealingly connected to the carrier conduit and the containment conduit to contain spilled fluid in the containment sections;
   a cable sensor associated with the containment conduit for detecting spilled fluid flowing in the containment conduit so as to locate the spilled fluid to a specific containment section; and
   a spill return door assembly located upstream from the spilled fluid barrier, the spill return door assembly, when implemented, includes a spill return door resiliently connected to the carrier conduit and is urged against an interior portion of the carrier conduit adjacent a spill opening.

2. The device, according to claim 1, further includes a network monitor that interfaces for communicating with an operator's data collection, analysis and reporting systems.

3. The device, according to claim 2, in which the cable sensor is connected to the network monitor so as to alert the operator to the location of the spilled fluid in real time.

4. The device, according to claim 2, in which the network monitor is interconnected with the cable sensor by a signal generation and analysis device, and includes a network modem, a network interface and a display/control, the network monitor being autonomously operable using solar power, battery and charger or alternate power.

5. The device, according to claim 4, in which the network monitor is in communication with operator land and wireless networks, and is capable of communicating with an auto emergency shutdown.

6. The device, according to claim 1, in which the cable sensor is located in the interstitial space at a lower portion of the containment conduit.

7. The device, according to claim 1, in which the cable sensor is mounted external and in close proximity to the containment conduit.

8. The device, according to claim 1, in which the cable sensor extends through a plurality of interstitial spaces.

9. The device, according to claim 1, in which the cable sensor is a combination selected from the group consisting of: an acoustic fiber optic cable, a thermal fiber optic cable, and a pipe strain fiber optic cable.

10. The device, according to claim 1, in which the spill door assembly includes a door spring connected to the spill return door, the door spring being located in the containment conduit.

11. The device, according to claim 1, in which the pipeline is located above ground, ice or water, or underground or in ice or in water.

12. The device, according to claim 1, in which the fluid includes gas, chemicals, the chemicals being synthetic, organic, or inorganic chemicals, the fluids being natural fluids including food fluids; liquefied natural gas, liquefied gas including propane and butane, crude oil, water, petroleum, light oil, or oil sands oil.

13. The device, according to claim 1, in which the cable sensor detects the presence of fluid in the interstitial space received from sources external to the containment conduit.

14. An autonomous fluid spill containment device for a pipeline having a carrier conduit for transporting a fluid and a containment conduit located around the carrier conduit to define a closed interstitial space for receiving fluid spilled from the carrier conduit, the device comprising:

a spilled fluid barrier forming an end of a containment section for stopping spilled fluid flow, the spilled fluid barrier being located in the interstitial space and extending between the carrier conduit and the containment conduit, the spilled fluid bather being sealingly connected to the carrier conduit and the containment conduit to contain spilled fluid entirely in the interstitial space;

a fiber optic cable sensor extending through a plurality of interstitial spaces via seals in the spilled fluid barriers of the containment conduit for detecting spilled fluid flowing in the containment conduit;

a network monitor that interfaces with the fiber optic cable sensor and communicates with an operator's data collection, analysis and reporting systems via the operator's land and wireless networks in real-time and operator's pipeline emergency shutdown systems in real-time; and     a time domain reflectometer located in the network monitor for detecting spilled fluid in the containment conduit, the spilled fluid creating discontinuities in the fiber optic cable sensor causing a pulse of light being sent down the fiber optic cable sensor to be reflected back to the time domain reflectometer.

15. The device, according to claim 14, in which the fiber optic cable sensor is connected to the network monitor so as to alert the operator to the location of the spilled fluid in real time.

16. The device, according to claim 14, in which the fiber optic cable sensor is located in the interstitial space at a lower portion of the containment conduit.

17. The device, according to claim 14, in which the fiber optic cable sensor is mounted external and in close proximity to the containment conduit.

18. The device, according to claim 14, in which the fiber optic cable sensor is a combination selected from the group consisting of: an acoustic fiber optic cable, a thermal fiber optic cable, and a pipe strain fiber optic cable.

19. The device, according to claim 14, in which the network monitor is interconnected with the fiber optic cable sensor by the time domain reflectometer, and includes a network modem, a network interface and a display/control, the network monitor being autonomously operable using solar power, battery and charger or alternate power.

20. The device, according to claim 14, in which the pipeline is located above ground, ice or water, or underground or in ice or in water.

21. The device, according to claim 14, in which the fluid includes gas, chemicals, the chemicals being synthetic, organic, or inorganic chemicals, the fluids being natural fluids including food fluids; liquefied natural gas, liquefied gas including propane and butane, crude oil, water, petroleum, light oil, or oil sands oil.

22. The device, according to claim 14, in which the fiber optic cable sensor detects the presence of fluid in the interstitial space received from sources external to the containment conduit.

23. The device, according to claim 22, in which the presence of fluid in the interstitial space received from sources external to the containment conduit being caused by ingestion of fluid from the area surrounding the containment pipe, the ingestion being caused by rupture, leak or seepage.

24. The device, according to claim 23, in which the rupture is caused by catastrophic pipeline failure; the leak being caused by puncture or environmental events including corrosion, thermal stresses or material abrasion; and the seepage being caused by corrosion, weld defects or seal failure.

25. The device, according to claim 14, in which the closed interstitial space defines the containment section.

26. The device, according to claim 14, includes a plurality of discrete containment sections, each containment section having at least one spilled fluid barrier sealing connected to the carrier conduit and the containment conduit to contain the spilled fluid in the interstitial space.

27. The device, according to claim 26, in which each containment section includes two spilled fluid barriers.

28. The device, according to claim 27, in which the containment sections extend along the pipeline to provide contiguous fluid leak containment.

29. The device, according to claim 27, in which the containment sections are each isolated from each other.

30. The device, according to claim 29, in which each containment section is leak proof.

31. The device, according to claim 14, in which a time delay between a pulse transmission and a reflection received at the time domain reflectometer is used to accurately locate the discontinuity.

32. The device, according to claim 31, in which when the pipeline is operating, a reference amplitude versus distance profile is determined by averaging over some period of time.

33. The device, according to claim 14, in which the fiber optic cable sensor extends to the network monitor via a seal in the containment conduit.

34. The device, according to claim 14, in which the spilled fluid barrier is sealingly connected to the carrier conduit using welds.

35. The device, according to claim 14, in which the spilled fluid barrier is sealingly connected to the containment conduit using seals.

36. The device, according to claim 14, in which the network monitor communicates using three message types, the message types include equipment health status messages; sensor data messages; and communication status messages.

\* \* \* \* \*